United States Patent [19]

Samide

[11] 4,120,528

[45] Oct. 17, 1978

[54] LATCH FOR OVERHEAD GUARDS ON INDUSTRIAL VEHICLES

[75] Inventor: Frank R. Samide, Chardon, Ohio

[73] Assignee: Towmotor Corporation, Mentor, Ohio

[21] Appl. No.: 816,832

[22] Filed: Jul. 18, 1977

[51] Int. Cl.[2] .................. B60J 7/24

[52] U.S. Cl. .................. 296/107

[58] Field of Search .................. 280/756; 296/102, 107, 296/108

[56] References Cited

U.S. PATENT DOCUMENTS

| | | | |
|---|---|---|---|
| 3,520,571 | 7/1970 | Rogers | 296/102 |
| 3,713,688 | 1/1973 | Monroe | 296/107 |
| 3,829,121 | 8/1974 | Ahrendt | 280/756 |
| 3,917,310 | 11/1975 | Mitsuishi | 280/756 |
| 4,026,597 | 5/1977 | Miller | 296/107 |
| 4,047,750 | 9/1977 | Samide | 296/107 |

*Primary Examiner*—Joseph F. Peters, Jr.
*Assistant Examiner*—Norman L. Stack, Jr.
*Attorney, Agent, or Firm*—James R. Bell

[57] ABSTRACT

Industrial vehicles including overhead guards of the type maintained in a first position by a weighted member and released to a second position when the weighted member is removed, are provided with a latch for latching the guard in the first position and movable to unlatch the guard for release to the second position.

5 Claims, 7 Drawing Figures

LATCH FOR OVERHEAD GUARDS ON INDUSTRIAL VEHICLES

BACKGROUND OF THE INVENTION

1. Field of the Invention

This invention relates generally to land vehicles of the wheeled type and more particularly to those having anti-tip overhead guards.

2. Description of the Prior Art

This invention relates to guard assemblies used on industrial vehicles such as forklift trucks and the like. The use of overhead guard surfaces to protect operators of forklift vehicles from falling material is well known. Use of such surfaces in connection with such vehicles is necessary as the vehicles are often used to elevate heavy and/or bulky materials above the head of the operator of the vehicle.

Many types of commonly used guard assemblies include a fixed horizontal surface extending over the area in which the operator sits or stands. This can create a problem in the case of electrically powered forklifts, as these vehicles often have a bulky, heavy battery situated generally centrally of the vehicle. It is often desirable to remove the battery for purposes of maintenance, etc., but a fixed guard assembly overlying the battery area can interfere with the quick and simple removal of the battery.

An improved guard assembly has been pivotally mounted to industrial vehicles such as forklift trucks and the like. Such a guard assembly comprises a horizontal guard surface secured to vertical support means, the guard surface generally overlying an operator's station on a vehicle of the sort described above. The support means has at its lower extremity a rearwardly extending base means, upon which base means rests a heavy removable element such as battery, for example. When the removal element is disposed in its operative position, it serves to secure the support means in a vertical position. Lifting of the element, such as by a chain hoist, serves to allow the support means to rotate forwardly of its vertical position, thereby positioning the guard surface forwardly of the removable element, allowing quick removal of the element by lifting.

This guard assembly also includes a stopping means on the forward edge of the support means designed to limit the degree of rotation of the support means by contact with an abutment surface, such as the floor of the vehicle, for example.

The guard assembly further includes a second pivoting means whereby the upper portion of the support means, including the guard surface, may be rotated rearwardly in order to provide a more compact vertical dimension of the vehicle as a whole to facilitate travel of the vehicle through passageways of limited clearance.

Since the above-described guard assembly is maintained in the vertical position due solely to the weight of the battery resting on the base, there is a need for a latch for securing the guard assembly in the vertical position. This need arises because, for example, a problem could occur should the overhead guard strike a stationary overhead object when the vehicle is moving in a rearward direction. If such should occur, it is possible that the guard could be pivoted out of its vertical position.

In view of the above, it would be advantageous to provide a latch for maintaining the guard assembly in the vertical position which overcomes the problems associated with the prior art.

SUMMARY OF THE INVENTION

The present invention is directed to overcoming one or more of the problems as set forth above.

According to the present invention this is accomplished by providing, on industrial vehicles including overhead guards of the type maintained in a first position by a weighted member and released to a second position when the weighted member is removed, a latch for latching the guard in the first position when the weighted member is positioned in the vehicle and movable to unlatch and release the guard to the second position when the weighted member is removed from the vehicle.

The foregoing and other advantages will become apparent from the following detailed description of the invention when considered in conjunction with the accompanying drawings. It is to be expressly understood, however, that the drawings are not intended as a definition of the invention but are for the purpose of illustration only.

DETAILED DESCRIPTION

Figure 1:
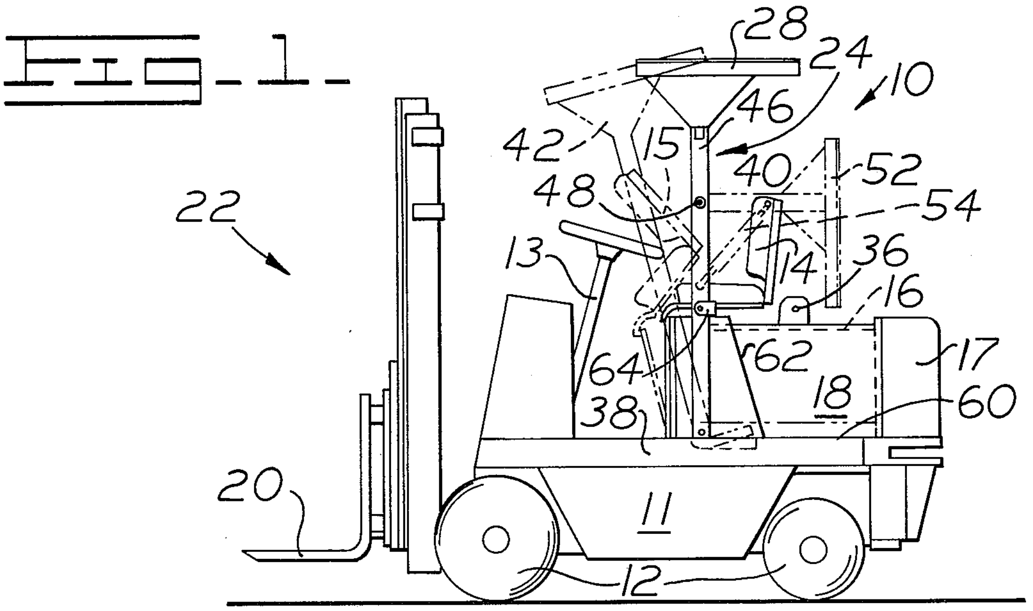
FIG. 1 is an elevational view of a forklift vehicle incorporating a latched overhead guard assembly.

Referring to FIG. 1, an exemplary embodiment of the invention includes a forklift or similar vehicle, generally designated 10, provided with motive means (not shown). The vehicle 10 shown in FIG. 1 is of a well-known type and comprises generally a frame 11 resting upon wheels 12 and is equipped with steering means 13 controlled by an operator (not shown) situated on an operator's seat 14. Seat 14 is shown in its operative position by solid lines and in a nonoperative position 15 by dotted lines.

A removable weighted element 16 such as a dry cell or battery unit is situated generally beneath and rearwardly of the operator's seat 14 and forwardly of a frame portion 17 located on the rearmost portion of the vehicle 10. In the preferred embodiment, the removable element 16 comprises a battery provided as a power source for said motive means and will be referred to as such in the following, such reference being understood to be by way of example only, and not by way of limitation.

It may be noted that battery 16 may rest inside a removable compartment 18, which may comprise a rectangular box-like structure. Compartment 18 may be mounted on vehicle 10 and generally retained thereon by side frame members 60, front frame member 62 and rear frame portion 17. It is to be understood that battery 16 can be an independently removable or insertable unit, or can rest inside such as that illustrated at 18. In the latter instance, the compartment and battery are removable and insertable as a unit. In this invention battery 16 is illustrated as being mounted in a compartment 18 but is not intended to be limited to such an arrangement. Under any circumstances, it is necessary for the battery 16 to be fitted from its operative position to remove it from the vehicle. An improved overhead guard assembly, generally designed 24, is movable from an overhanging position to make it readily possible to attach a lift device to the battery for lifting the battery from its operative position in said compartment.

In operation, the vehicle 10 moves about a work environment on wheels 12, its function being to lift, transport and deposit heavy or bulky articles. Such articles are often situated on pallets into which a well-known fork 20 of a vertical conveyor assembly, generally designated 22, are inserted. The vertical conveyor assembly 22 is equipped with power means such as a motor (not shown) which allows the operator to raise and lower fork 20, thereby raising and lowering the article to be moved. The conveyor assembly 22 has telescoping means (not shown) which allow the operator to raise the material to a level higher than the top of the conveyor assembly as represented in FIG. 1.

The operator is situated on seat 14 which may be located below and rearwardly of an object being supported on fork 20. Safety regulations require that the operator be protected from falling objects and, accordingly, it is desirable to equip the vehicle frame 11 with a guard structure designed to protect the operator from falling objects without interfering with the ready removal of the battery 16.

Figure 2:
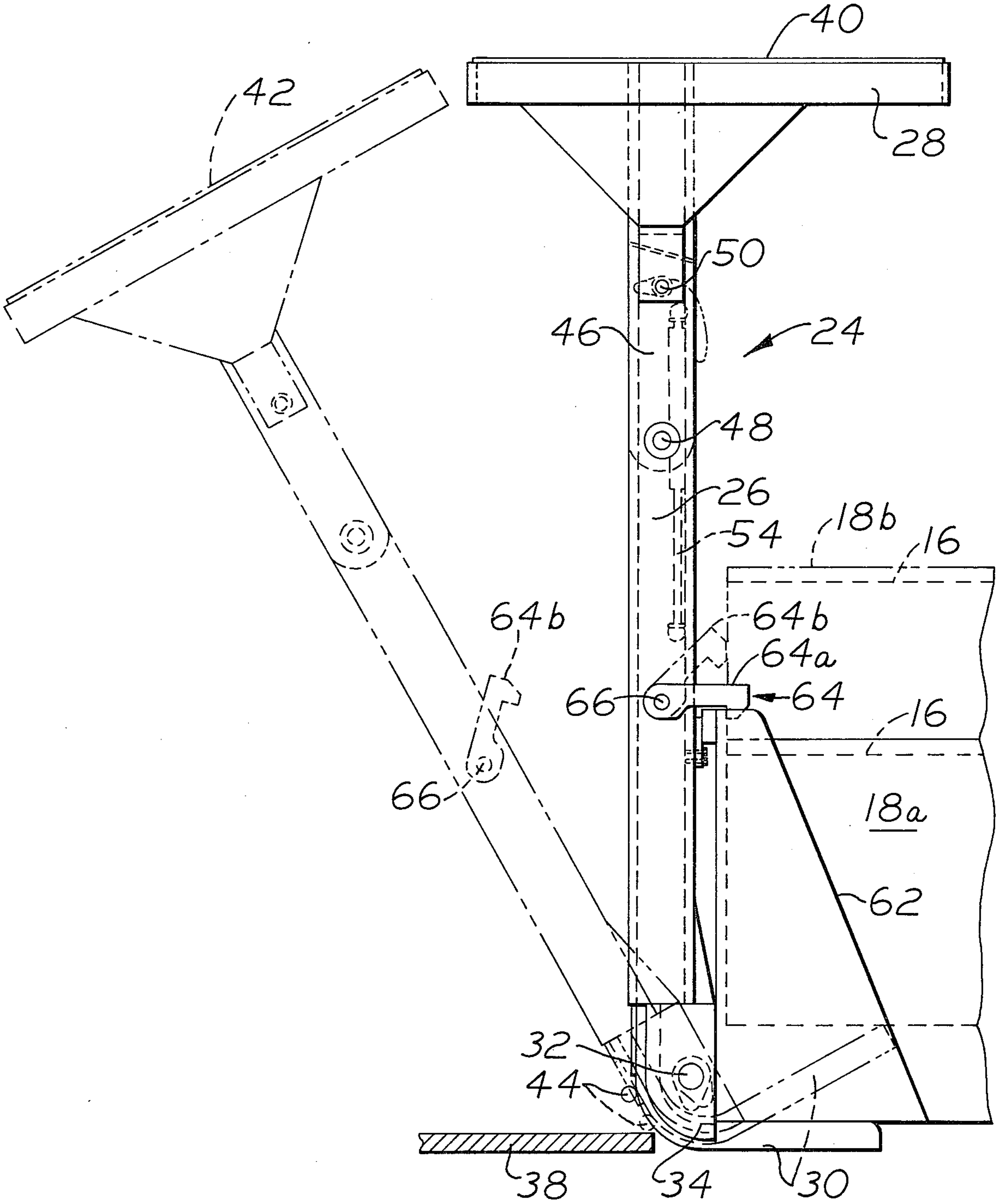
FIG. 2 is an enlarged elevational view of an overhead guard assembly having a latch and a portion of a removable vehicle element resting thereon.

Referring to FIG. 2, guard assembly 24 includes vertical support means 26, a guard surface 28 pivotally secured to the uppermost portion of support means 26, and a rigid base means 30 secured to and extending rearwardly from the bottommost portion of support means 26. In the preferred form of the invention shown, base means 30 is formed integratedly with and extends perpendicularly to said vertical support means 26.

Figure 3:
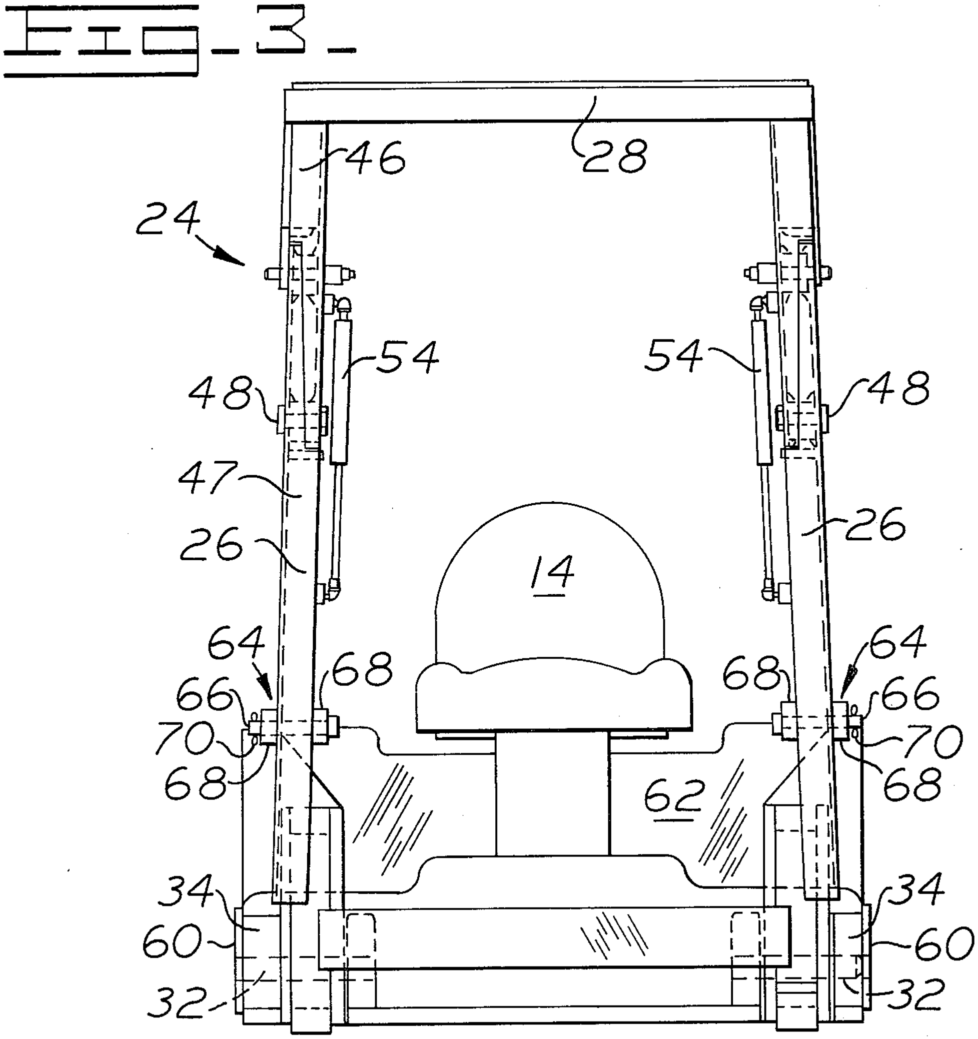
FIG. 3 is a front elevational view of the apparatus.

The guard assembly 24 is pivotally secured to the vehicle frame 11 so as to allow rotation about an axis transverse to the vehicle frame. Referring to FIG. 3, this is accomplished in a simple manner as by the extension of pivots 32 laterally of the support means 26 through perforate ears 34, said ears being an integral part of vehicle frame 11.

As shown in FIG. 2, the center of gravity of the guard assembly 28 is located forwardly of the transverse pivot axis defined by pivots 32. The assembly will, therefore, tend to rotate forwardly unless restrained. Retention is accomplished in FIG. 2 by means of leverage, the removable element 16 resting on base means 30. The weight of element 16 prevents the counterclockwise rotation (as shown in FIG. 2) of the base means 30, thereby maintaining the support means 26 in an upright position.

As stated above, one of the objects of the present invention is to allow quick and simple removal of the vehicle's power source, such as the battery 16, by lifting. In the preferred embodiment of the invention, the battery 16 may be removed by means of a chain hoist or similar lifting means (not shown) attached to the compartment 18 at lifting holes 36, as shown in FIG. 1. Lifting of the battery 16 a small distance above the surface of a vehicle floor 38 to the position shown in phantom in FIG. 1 allows the guard assembly 24 to pivot or rotate forwardly by virtue of its own weight from an operative or first position 40 (shown in solid lines) to a nonoperative or second position 42 (shown by dotted lines). Such rotation allows the guard surface 28 to assume a position forward of the line of upward travel of the battery 16, thus allowing removal of the battery 16 by a simple, upward lifting motion.

One embodiment of the invention, as shown in FIG. 2, includes a stopping means 44, such as metal rod portions, secured to the forward edge of support means 26. Said stopping means 44 contacts an abutment surface, such as the vehicle floor 38, as the guard assembly 24 rotates forward, thus stopping the motion of the guard assembly 24 as it reaches a desired degree of rotation. This feature is convenient as it allows the guard assembly 24 to maintain such that the base means 30 project at an acute angle from the vehicle floor 38. As battery 16 is lowered into its compartment 18, the battery 16 contacts the base means 30. As the battery 16 continues to be lowered, the weight of the battery 16 forces base means 30 to return to its operative position, thereby disposing support means 26 in a vertical position.

An uppermost portion 46 of the support means 26 is pivotally secured to a lowermost portion 47 thereof, as at a pivot point 48 (see FIG. 2). Removal of a captive pin 50 in FIG. 2 allows the uppermost portion 46 to rotate rearwardly to a nonoperative position 52 as shown by dotted lines in FIG. 1. Such a configuration of the guard assembly 24 is convenient, as it allows the vehicle 10 to travel through passageways of limited clearance. As shown, a pair of cylinders 54 are connected between the lowermost portion 47 of the support means 26 and the uppermost portion 46 thereof. The cylinders 54 are operative to raise and lower the guard surface 28 about the pivot 48. The details of operating said cylinders 54 to move the guard surface are not described as they form no part of the present invention.

In accordance with this invention, FIG. 1 generally illustrates means such as a latch 64 for releasably latching overhead guard assembly 24 in first position 40 when weighted element 16 is mounted in vehicle 10. Latch 64 also unlatches guard assembly 24 for pivoting toward second position 42 when weighted element 16 is removed from vehicle 10 as will be more fully discussed later herein.

FIG. 3 further illustrates that the invention can be carried out by pivotally mounting latch 64 on vertical guard support 26. This can be accomplished by inserting a shaft 66 through latch arms 68 and through guard support 26 and securing shaft 66 with a cotter pin 70 or the like. Latch 64 is positioned on support 26 so as to be engageable with frame portion 62.

In FIG. 2, pivotally or movably mounted latch 64 is illustrated in a first or latched position *64a* with frame member 62 and overhead guard assembly 24 is illustrated in a first or upright position 40. In first position *64a*, latch 64 engages frame member 62 and extends to overhang battery 16 when assembly 24 is in first position 40. Also it can be seen that removable compartment 18, including battery 16, is in a first position 18a resting on base 30. As a result, overhead guard assembly 24 is urged into its upright position 40 since base 30 is under the influence of battery 16. Latch 64 is pivotally movable under the influence of gravity to engage frame member 62 and latch guard assembly 24 in first position 40 when battery 16 is positioned in vehicle 10.

Further illustrated in FIG. 2 is latch 64 in a second or unlatched position *64b* and overhead guard assembly 24 is illustrated in a second pivoted or tilted position 42.

Also it can be seen that removable compartment 18, including battery 16, is in a raised or second position 18*b*. Latch 64 is moved from position 64*a* to 64*b* upon contact with compartment 18. This is due to the extension of latch 64 overhanging compartment 18 and battery 16. As a result, upon contact due to lifting or raising compartment 18, latch 64 is pivoted from position 64*a* to 64*b*, and since base 30 is no longer influenced by the weight of battery 16, base 30 raises and assembly 24 pivots from first position 40 to second position 42. Also, latch 64 is provided such that it remains in raised position 64*b* when support 24 is in tilted position 42.

Figure 4:
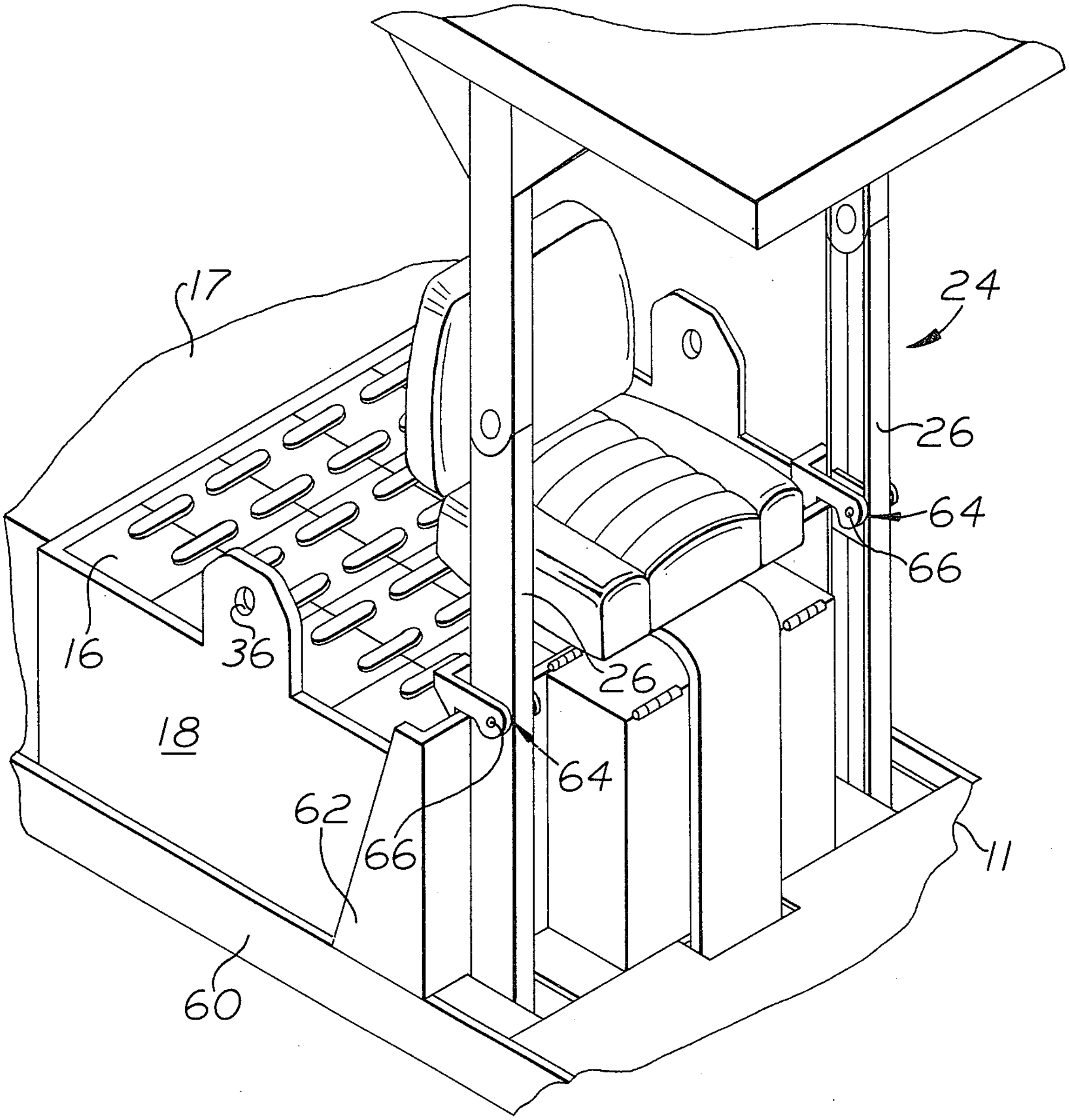
FIG. 4 is a partial isometric view illustrating a forklift truck utilizing the latch of this invention.

FIG. 4 further exemplifies the inventive environment wherein guard assembly 24 is pivotally mounted on frame 11. Battery 16 rests in compartment 18 provided with lifting holes 36. Compartment 18 is mounted on frame 11 between front frame portion 62, side frame portions 60 and frame portion 17. Specifically, the inventive concept is exemplified by, but not limited to, latches 64 pivotally mounted at shafts 66 on vertical supports 26 in engagement with front frame portion 62 so as to overhang compartment 18 including battery 16.

Figure 5:
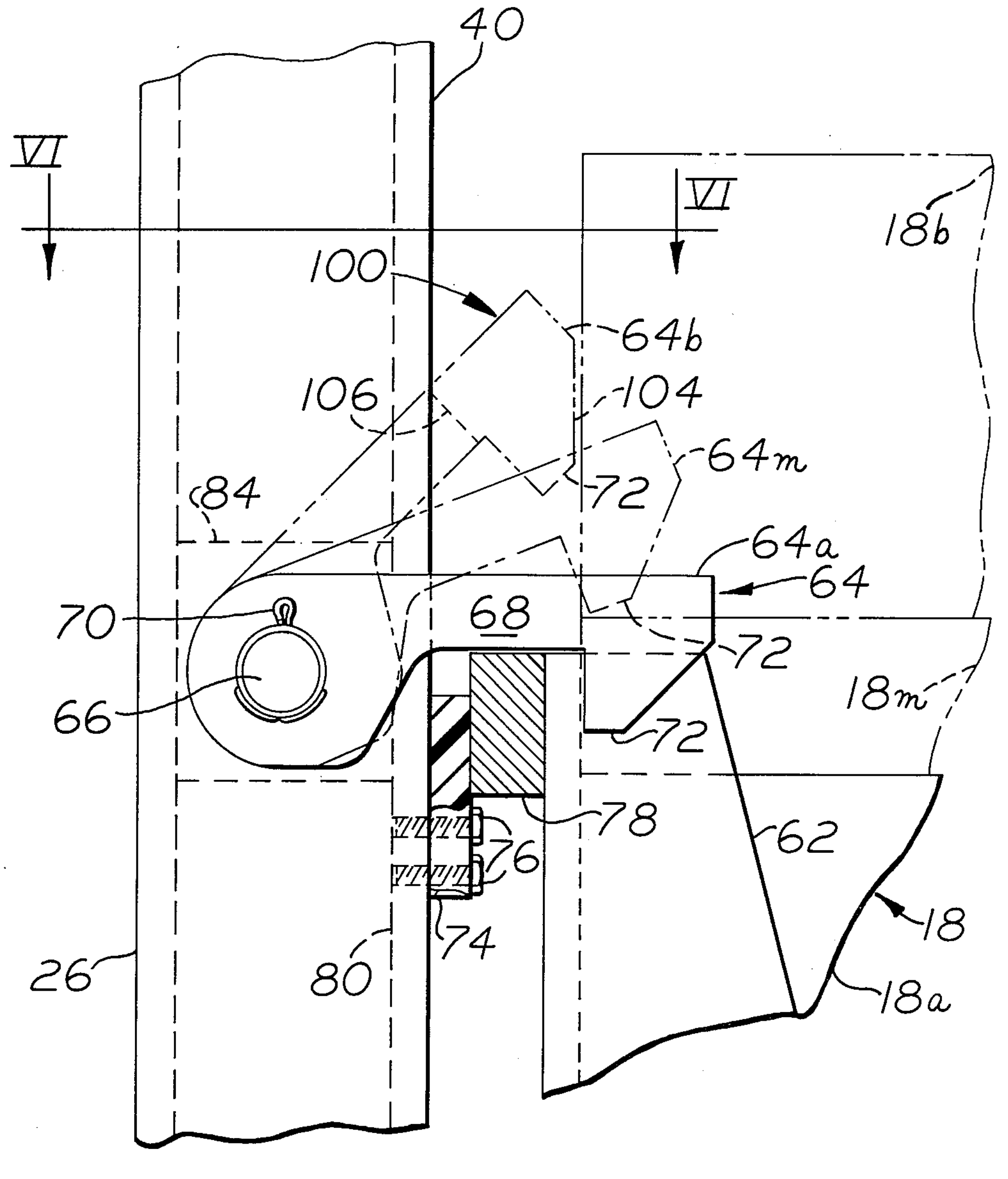
FIG. 5 is an enlarged partial side elevational view illustrating the movable latch of this invention.

FIG. 5 illustrates pivotal latch 64 mounted on support 26 by shaft 66 secured by cotter pin 70. Latch 64, when in first position 64*a* overhangs compartment 18 in first position 18*a* and engages front frame portion 62. That is, a downwardly extending lip 72, protruding beyond latch arm 68, engages front frame portion 62. As compartment 18 is raised to middle position 18*m*, compartment 18 engages lip 72 and urges latch 64 upwardly from first position 64*a* to middle position 64*m*. Further raising of compartment 18 to second position 18*b* urges latch upwardly to its extreme or second latch position 64*b*. In the extreme position 64*b*, latch 64 no longer overhangs compartment 18 so that compartment 18 can be continued to be raised to position 18*b* and ultimately, of course, removed from vehicle 10.

Further illustrated in FIG. 5 are bumper pad 74, preferably of a resilient material, such as about a 90 durometer rubber material, fixed to support 26 preferably by bolts 76, and metal bumper bar 78, preferably of fabricated steel and welded to front frame portion 62 and considered to be a portion thereof. Both pad 74 and bar 78 are positioned so as to be engaged when support 26 is in its upright position 40. In this manner, there is provided some limit to wear and noise due to possible contact between support 26 and front frame portion 62. Bolts 76 are preferably in threaded engagement with a flange 80 of a channel beam which generally comprises support 26 as is well known.

Figure 6:
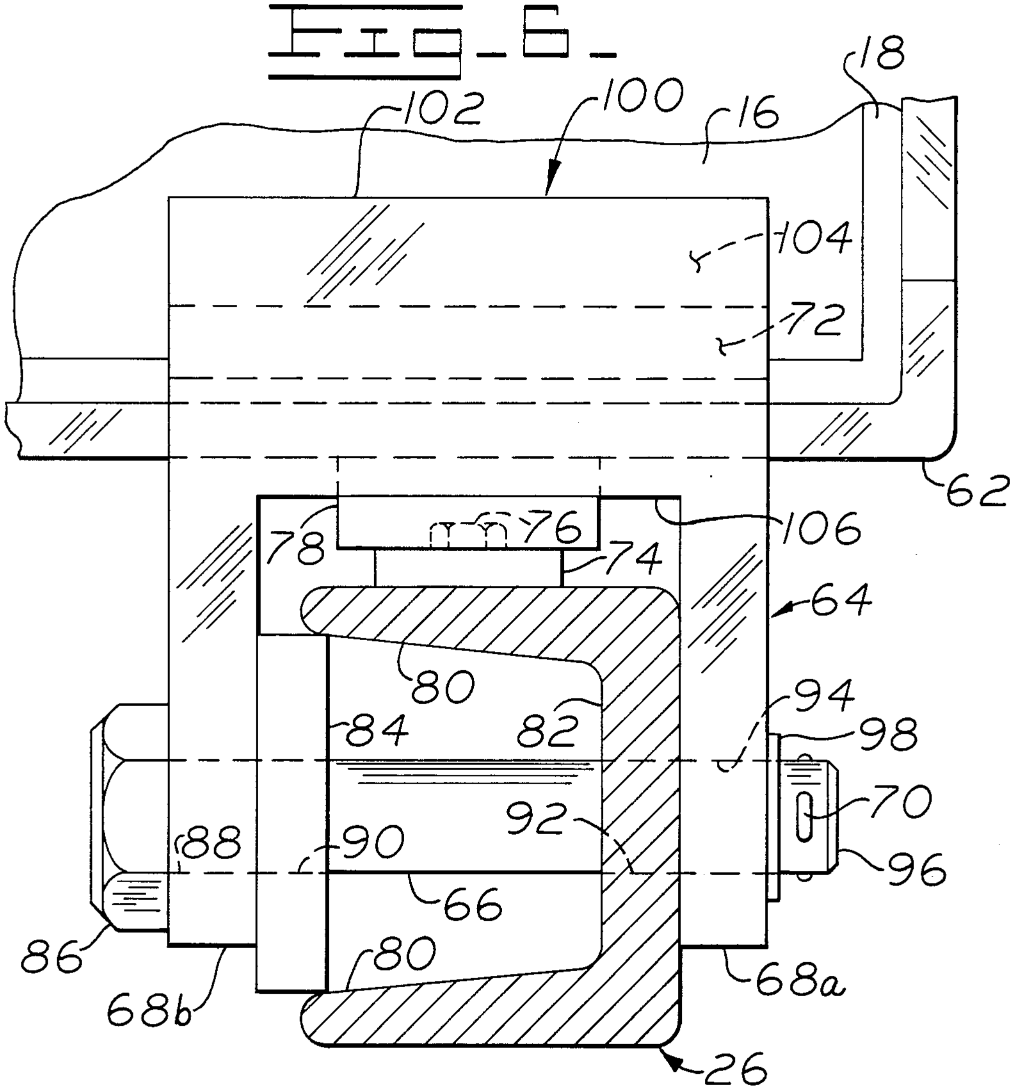
FIG. 6 is an enlarged partial overhead view of the latch taken along the line VI—VI of FIG. 5.

FIG. 6 illustrates another view of latch 64 wherein support 26 comprises a channel beam having flanges 80 interconnected by a base 82. A mounting plate 84, preferably of steel, is welded to flanges 80 of support 26 opposite base 82. Latch arms overlap support 26 so that one arm 68*a* is adjacent base 82 and another arm 68*b* is adjacent mounting plate 84. Shaft 66, at enlarged head end 86, passes through opening 88 in arm 68*b*, through opening 90 in plate 64, through opening 92 in base 82 and through opening 94 in latch arm 68*b*. Shaft end 96 of shaft 66 is preferably accommodated by a washer 98 and cotter pin 70 retains shaft 66 in place. It is contemplated that other attachments are possible for mounting latch 64 on support 26 in accordance with this invention.

Figure 7:
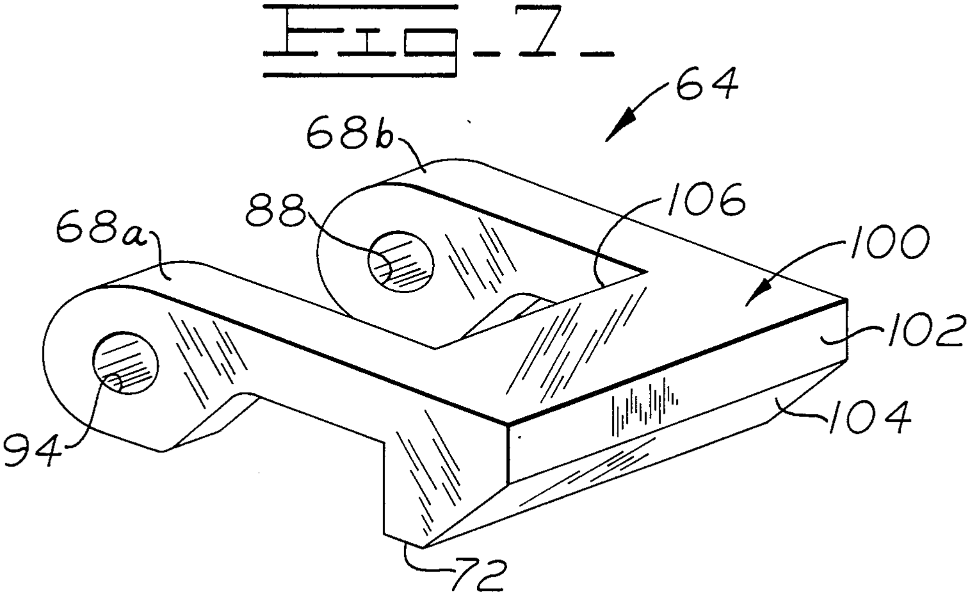
FIG. 7 is an enlarged isometric view illustrating a configuration of the latch of this invention.

Latch arms 68*a*, 68*b*, FIGS. 6 and 7, preferably extend from support 26 in a substantially parallel manner and terminate at cross member 100 which interconnects the latch arms. Cross member 100 includes a face portion 102, a slanted surface 104 and lip portion 72. Cross member 100 extends to overhang compartment 18 and battery 16 and the downwardly protruding lip 72 engages front frame portion 62.

It is to be noted that a surface 106 which is that portion of cross member 100 mounted closest to support 26, engages support 26 and limits further upward pivoting of latch 64 beyond position 64*b*, see FIG. 5. Also, slanted surface 104 provides a sliding surface for contact with compartment 18 when the compartment is removed from vehicle 10.

Latch 64, as viewed in FIG. 7, is preferably cast as a unit of a suitable steel alloy and machine finished as desired. However, it is contemplated that other materials, methods of manufacture and structural configurations may suffice.

In operation, with the elemental portions of vehicle 10 assembled as above-described, it can be seen that the weight of battery 16 in compartment 18 is sufficient for influencing base 30 and pivoting assembly 24 into upright position 40. Gravity influences latch 64 to pivot downward so that lip 72 overhangs compartment 18 and engages front frame portion 62.

When it is desired to remove battery 16 from vehicle 10, hooks from an associated hoist, not shown, may engage holes 36 of compartment 18. Upon raising compartment 18, lip 72 is engaged thereby and latch 64 is pivoted upwardly to disengage front frame portion 62. Also, simultaneously, the removal of the weighted influence of battery 16 on base 30 permits the base to raise thus permitting assembly 24 to pivot forward to position 42. As a result, overhead guard 28 of assembly 24 is pivoted so as not to obstruct removal of battery 16. Also, latch 64 remains pivoted to an upward position wherein latch surface 106 engages support 26.

When compartment 18, including battery 16, is lowered onto vehicle 10, the weight of battery 16 influences base 30 such that assembly 24 pivots from tilted position 42 to upright position 40 until pad 74 engages bar 78. As a result, latch 64, influenced by gravity, pivots downwardly so that lip 72 engages front frame portion 62 for maintaining assembly 24 in upright position 40.

The foregoing has described a latch 64 for maintaining guard assembly 24 in upright position 40 in the event that guard assembly 24 might foreseeably strike a stationary overhead object when vehicle 10 is moving in a rearward direction. Thus, in such an event, latch 24 could limit unanticipated pivoting of assembly 24.

It is anticipated that other structural arrangements and devices are capable of accomplishing the invention defined hereinafter.

The embodiments of the invention in which an exclusive property or privilege is claimed are defined as follows:

1. An industrial vehicle, comprising:

a weighted member removably mounted in the vehicle;

an overhead guard mounted on the vehicle and pivotally controlled between first and second positions by mounting and removing the weighted member, respectively; and means for latching and unlatching the guard, said means being movable under the influence of gravity to latch the guard in the first position when the weighted member is positioned in the vehicle and being movable by the weighted member to unlatch the guard as the weighted member is removed from the vehicle.

2. An overhead guard for industrial vehicles, comprising:

a vehicle frame;

guard support means mounted on the frame for pivoting between a first and a second position;

a weighted member removably positioned in engagement with the frame and the guard support means; and means for latching and unlatching the guard support means, said means being movable under the influence of gravity to latch the guard support means in the first position when the weighted member is positioned in the vehicle and being movable by the weighted member to unlatch the guard support means, as the weighted member is removed from the vehicle.

3. An overhead guard assembly for industrial vehicles having a frame and a weighted member carried by said frame, the overhead guard assembly comprising:

guard support means mounted on the frame for pivoting between a substantially upright position and a substantially tilted position; and means for latching and unlatching the guard support means, said means being movable under the influence of gravity to latch the guard support means in the upright position when the weighted member is positioned in the vehicle and being movable by the weighted member to unlatch the guard support means and permit the guard support means to pivot to the tilted position as the weighted member is removed from the vehicle.

4. The overhead guard assembly of claim 3, comprising:

resilient means mounted on the guard support means for engagement with a portion of the frame.

5. In an industrial vehicle of the type having a weighted member removably mounted in the vehicle and an overhead guard connected for pivoting between a substantially upright and a substantially tilted position, the improvement comprising:

means for latching and unlatching the guard, said means being movable under the influence of gravity to latch the guard in the upright positon in response to mounting the weighted member in the vehicle and being movable by the weighted member to unlatch the guard and permit the guard to pivot to the tilted position in response to removing the weighted member from the vehicle.

* * * * *